United States Patent
Koers

(10) Patent No.: US 6,283,309 B1
(45) Date of Patent: Sep. 4, 2001

(54) DEVICE FOR PURIFYING GASES, SUCH AS AIR IN PARTICULAR, OR LIQUIDS, SUCH AS WATER IN PARTICULAR

(76) Inventor: Bonno Koers, De Bogaard 43, 6983 He Doesburg (NL)

( * ) Notice: Subject to any disclaimer, the term of this patent is extended or adjusted under 35 U.S.C. 154(b) by 0 days.

(21) Appl. No.: 09/444,290

(22) Filed: Nov. 22, 1999

(30) Foreign Application Priority Data

Nov. 20, 1998 (NL) .................................................. 10-10610

(51) Int. Cl.⁷ .............................. B01D 29/05; C02F 3/04
(52) U.S. Cl. ......................... 210/488; 210/483; 210/615
(58) Field of Search .................................. 210/283, 284, 210/287, 290, 291, 483, 488, 497.01, 615, 616, 617

(56) References Cited

U.S. PATENT DOCUMENTS 3,112,261 * 11/1963 Porter et al. ......................... 210/615
4,908,128 * 3/1990 Chiba ................................... 210/615
5,718,823 * 2/1998 Tomita et al. ........................ 210/615

FOREIGN PATENT DOCUMENTS

0190801 * 8/1986 (EP).
2051381 * 4/1971 (FR).

OTHER PUBLICATIONS

Derwent abstract of Great Britain Patent No. 1281874, 1972.*

* cited by examiner

Primary Examiner—John Kim
(74) Attorney, Agent, or Firm—Foley & Lardner

(57) ABSTRACT

Device for purifying gases or liquids comprises a chamber provided with intakes and outlets, in which filter material is incorporated. Micro organisms are used for the purification. The filter material is a flat mat having large open pores and being made of foamed plastic material, which is rolled-up with a supporting element made of—at least partly—undulated, mutually connected, resilient threads, so that a certain distance between the parts of the mat radially following one another remains free. The rolled-up mat can be fittingly mounted in a supporting structure, such as a pipe. A number of pipes can be stacked within the chamber.

13 Claims, 1 Drawing Sheet

DEVICE FOR PURIFYING GASES, SUCH AS AIR IN PARTICULAR, OR LIQUIDS, SUCH AS WATER IN PARTICULAR

FIELD OF THE INVENTION

The invention relates to a device for purifying gases or liquids, said device comprising a chamber in which filter material is received, said chamber having intakes and outlets for the medium to be purified, said filter material being a mat having large open pores and being made of foamed plastic material, said mat being intended for absorbing micro organisms.

DESCRIPTION OF THE RELATED ART

In a device of this type, as described in EP-A-0 190 801, a commercially available mat is employed, its one side being flat and its other side being provided with projecting portions so that the surface, seen in cross-section, has an undulated profile. The mat has a very large surface per unit of volume and has good adhesive properties for micro organisms. A number of such mats are placed on top of each other so that a plane surface of one mat contacts an undulating surface of the mat lying on it. Due to this, a certain free space remains between successive mats.

Although a good purifying result is achieved, there is the difficulty that the medium flowing through and along the mats experiences a considerable flow resistance. Using a rolled-up strip of foamed plastic material in a biological filter is known per se from GB-A-1 281 874. There, the strips are wound in such a way, that successive windings are spaced apart across some distance. To that end, the strip will be heated during rolling it up, so that a more or less stiff unity is achieved. It is obvious that it can only be used with relatively small dimensions of the strip.

Using a rolled-up strip is further known from FR-A-2 051 381. However, therein a foil of plastic and an undulated foil are used, so that continuous channels are achieved.

SUMMARY OF THE INVENTION

The object of the invention is to remove this difficulty and to that end provides for, that the mat of foamed plastic material has a flat surface on both sides and is rolled-up under insertion of a supporting element made of - at least partly - undulated, mutually connected, resilient threads, in such a way that a certain distance between the parts of the mat radially following one another remains free by the presence of the supporting element and the rolled-up mat can be fittingly mounted in a supporting structure.

It has turned out, that the micro organisms, providing for purification of the medium flowing through the device, exert their action substantially at the surface of the mat. Due to the presence of the supporting element, the flow resistance exerted on the medium flowing through, is restricted considerably, even though a good purifying action is achieved by the presence of the micro organisms on the surface of the mat. Manufacturing such a device is relatively simple too, and thus inexpensive.

According to a further development of the invention, the supporting structure, in which the filter material is received, will be a pipe having a framework therein for supporting the filter material, the pipe being arranged vertically in the chamber.

The width of such a mat will be kept restricted in order to prevent the vertically arranged mat from deforming under influence of its weight. In order to achieve a sufficiently large capacity of a device, it can be provided for, that a number of pipes, every one of them containing filter material, are stacked on top of one another, to which purpose parts of the pipes can engage and support each other.

This also contributes to the fact that the mats can be easily replaced, if necessary. A contaminated mat can then be cleaned so that it can be used again.

In order to render the mat biologically active, when the mat is brought to use, a biomass is applied on it, such as in the form of a graft, for example. The composition of said graft will depend on the nature and the composition of the medium to be treated. During use, the size of the biomass will increase so that the optimum efficiency of the device will be achieved after some time.

The device can be used for purifying air containing volatile hydrocarbons. Then, water will be sprayed onto the mat from above, so that the water consumption is reduced to a minimum. There, the air will be led through the chamber from the bottom to the top.

There, means for keeping or bringing the pH-value of the recirculated water at the desired value can be present. It is also possible to add nutrients to the water for an optimum biological purification of the air flowing through the device.

The device can also be provided with measuring equipment for the temperature, the salinity and the pressure drop. By this, the most essential conditions of the surrounding for the micro organisms can be monitored.

The device can also be used for purifying water. Then, the water can flow through the device from the top to the bottom and air can be brought into the lower part of the chamber so that it will flow through the water to be purified from the bottom to the top.

BRIEF DESCRIPTION OF THE DRAWINGS

The invention is further explained by way of an example, illustrated in the drawings, in which.

DETAILED DESCRIPTION OF SPECIFIC EMBODIMENTS

Figure 1:
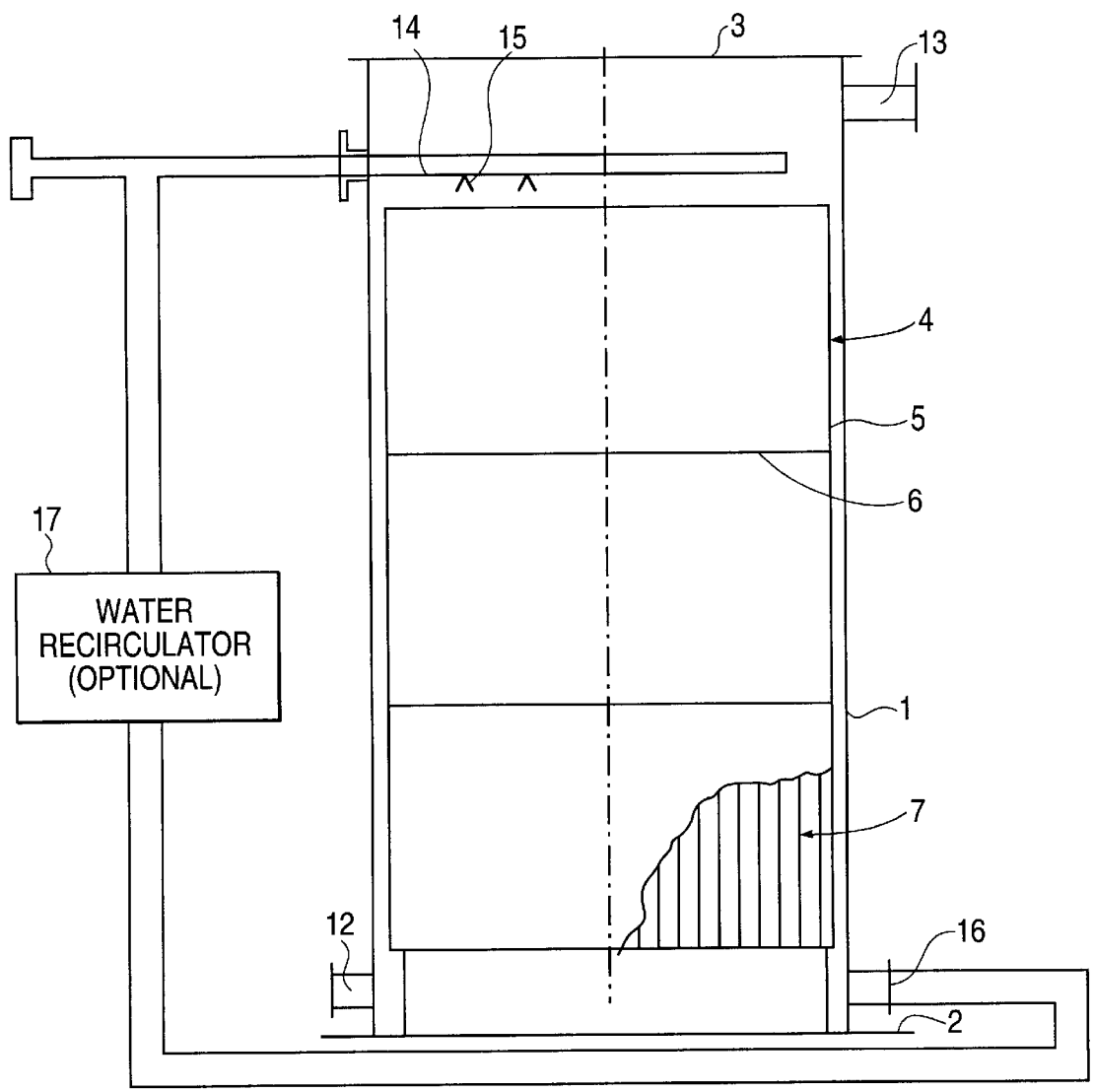
FIG. 1 shows diagrammatically a vertical cross-section of a device for purifying air.

The device illustrated in FIG. 1 comprises the cylindrical chamber 1 that can be made of glass-fibre reinforced plastic, for example. This material can be resistive against aggressive acids and biological activity. At its bottom side, the chamber 1 is closed-off by a baseplate 2, and at its top side by a lid 3, which can be pressed against the chamber, e.g. by a number of bolts, for closing it.

Figure 2:
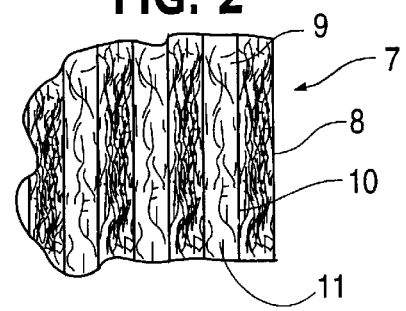
FIG. 2 shows diagrammatically a cross-section of a part of a filter material present in the device.

Within the chamber 1, there are three filter elements 4, each constituted by a pipe 5 being provided with a framework 6 at its bottom side and accommodating filter material 7. As illustrated in FIG. 2, the filter material 7 is obtained by rolling-up a mat 8 made of foamed plastic material together with a supporting element 9. The supporting element 9 is in particular formed by a netting of resilient threads mutually connected such as by welding or entwining. There, one can start from a very coarse open fabric of 10 threads to which undulated threads 11 are connected. A similar material is commercially available.

A certain distance between the parts of the mat radially following one another remains free by the presence of the supporting element 9. The rolled-up assembly of mat 8 and supporting element 9 is fittingly mounted in a pipe 5 for constituting a filter element 4.

The mat 8 can be made of polyurethane, polyethylene or a similar material.

The lower and upper edge of the stacked pipes 5 of a filter element 4 are designed such that the pipes 5 rest on each other, due to which the wall of the chamber 1 is only loaded to a small degree.

At its bottom side, the chamber 1 is provided with an air intake 12 and at the top side with an air outlet 13 for discharge of purified air.

Above the uppermost filter element 4 is a conduit 14 provided with one or more spray nozzles 15 for spraying water on it. At the bottom side of the chamber 1 the water is discharged by means of a conduit 16. The conduit 14 having the spray nozzles 15 can easily be removed when the filter elements 4 are to be replaced.

When the device will be used for purifying water, this will be brought onto the uppermost filter element 4 from above. The water will then be distributed across the filter element 4 to flow downwards. The water is discharged from the lower end of the chamber 1. Air can be supplied to the lower end of the chamber 1, in such a way that the air moves upwards through the water. Optional water recirculator 17 may be configured between conduit 16 and conduit 14 for recirculating water from the lower end of the chamber to the spray nozzles.

It will be obvious, that only one single possible embodiment of a device according to the invention has been illustrated in the drawing and that only some possible applications have been described above. Many changes can be made without being beyond the inventive idea as it is defined in the claims.

What is claimed is:

1. Device for purifying gases or liquids, said device comprising:
   a chamber in which filter material is incorporated;
   said chamber having intakes and outlets for the medium to be purified;
   said filter material being a mat having large open pores and being made of foamed plastic material;
   said mat being intended for absorbing micro organisms;
   said mat of foamed plastic material having a flat surface on both sides;
   said mat being rolled-up with a supporting element made of—at least partly—undulated, mutually connected, resilient threads, in such a way that a certain distance between parts of the mat radially following one another remains free by the presence of the supporting element; and
   said rolled-up mat can be fittingly mounted in a supporting structure.

2. Device according to claim 1, wherein:
   the supporting structure, in which the filter material is received, is a pipe having a framework therein for supporting the filter material; and;
   said pipe being arranged vertically in the chamber.

3. Device according to claim 2, further comprising:
   a number of pipes;
   said pipes containing filter material; and
   said pipes being stacked on top of one another, to which purpose parts of the pipes can engage and support each other.

4. Device according to claim 1, further comprising:
   a water supply conduit;
   said water supply conduit being provided with one or more spray nozzles; and
   said water supply conduit being mounted above the filter material for purifying air.

5. Device according to claim 4, further comprising a means for recirculating the sprayed water.

6. A device for purifying a medium comprising:
   a filter chamber with an intake and an outlet for the medium to be purified;
   said filter chamber having a filter with large open pores;
   said filter being intended for absorbing micro organisms;
   said filter being a mat made of foamed plastic material;
   said mat being rolled-up with a supporting element inserted between layers of the mat; and
   said supporting element is at least partly made of undulated, mutually connected, resilient threads, in such a way that a distance between parts of the mat radially following one another remains free by the presence of the supporting element.

7. A device according to claim 6, wherein said medium is air.

8. A device according to claim 6, wherein said medium is water.

9. A device according to claim 6, wherein said mat can be fittingly mounted in a supporting structure.

10. A device according to claim 9, wherein the supporting structure is a pipe having a framework therein for supporting filter material with said pipe being arranged vertically in the chamber.

11. A device according to claim 10, further comprising a number of pipes containing filter material stacked on top of one another, wherein parts of the pipes can engage and support each other.

12. A device according to claim 6, further comprising a liquid supply conduit wherein at least one spray nozzle is mounted above the filter for purifying a gas.

13. A device according to claim 12, wherein a path to recirculate liquid is provided.

* * * * *